(12) United States Patent
Ukrainczyk

(10) Patent No.: US 9,586,860 B2
(45) Date of Patent: Mar. 7, 2017

(54) METHOD OF MAKING THREE DIMENSIONAL GLASS CERAMIC ARTICLE

(71) Applicant: CORNING INCORPORATED, Corning, NY (US)

(72) Inventor: Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/443,775

(22) PCT Filed: Nov. 18, 2013

(86) PCT No.: PCT/US2013/070483
§ 371 (c)(1),
(2) Date: May 19, 2015

(87) PCT Pub. No.: WO2014/081647
PCT Pub. Date: May 30, 2014

(65) Prior Publication Data
US 2015/0299036 A1    Oct. 22, 2015

Related U.S. Application Data

(60) Provisional application No. 61/728,392, filed on Nov. 20, 2012.

(51) Int. Cl.
| | |
|---|---|
| *C03C 21/00* | (2006.01) |
| *C04B 35/19* | (2006.01) |
| *C04B 35/634* | (2006.01) |
| *C04B 35/636* | (2006.01) |
| *C03C 3/083* | (2006.01) |
| *C03C 8/16* | (2006.01) |
| *C03C 10/00* | (2006.01) |
| *C03C 14/00* | (2006.01) |
| *C03B 32/02* | (2006.01) |

(52) U.S. Cl.
CPC ............ *C03C 21/002* (2013.01); *C03B 32/02* (2013.01); *C03C 3/083* (2013.01); *C03C 8/16* (2013.01); *C03C 10/0027* (2013.01); *C03C 14/00* (2013.01); *C04B 35/19* (2013.01); *C04B 35/634* (2013.01); *C04B 35/6365* (2013.01); *C03C 2214/20* (2013.01); *C04B 2235/3232* (2013.01); *C04B 2235/36* (2013.01); *C04B 2235/604* (2013.01); *C04B 2235/6022* (2013.01); *C04B 2235/6027* (2013.01); *C04B 2235/80* (2013.01); *C04B 2235/94* (2013.01); *C04B 2235/9646* (2013.01); *C04B 2235/9653* (2013.01); *C04B 2235/9661* (2013.01)

(58) Field of Classification Search
CPC .......... C03C 21/00; C03B 32/02; C04B 35/19
USPC ...................................... 65/30.13
See application file for complete search history.

(56) References Cited

U.S. PATENT DOCUMENTS

| | | | |
|---|---|---|---|
| 5,491,115 | A | 2/1996 | Pfitzenmaier et al. |
| 5,853,446 | A | 12/1998 | Carre et al. |
| 6,258,191 | B1 | 7/2001 | Fasano et al. |
| 7,279,238 | B2 | 10/2007 | Brodkin et al. |
| 7,470,640 | B2 | 12/2008 | Badding et al. |
| 7,666,511 | B2 | 2/2010 | Ellison et al. |
| 7,695,556 | B2 | 4/2010 | Johnson et al. |
| 8,158,543 | B2 | 4/2012 | Dejneka et al. |
| 8,163,561 | B2 | 4/2012 | Fontaine et al. |
| 8,243,276 | B2 | 8/2012 | Couillard et al. |
| 8,586,492 | B2 | 11/2013 | Barefoot et al. |
| 8,664,130 | B2 | 3/2014 | Beall et al. |
| 8,802,581 | B2 | 8/2014 | Dejneka et al. |
| 8,969,226 | B2 | 3/2015 | Dejneka et al. |
| 9,156,724 | B2 | 10/2015 | Gross |
| 9,290,413 | B2 | 3/2016 | Dejneka et al. |
| 2010/0104486 | A1 | 4/2010 | Hoysan et al. |
| 2012/0133943 | A1 | 5/2012 | Fontaine et al. |
| 2012/0135226 | A1 | 5/2012 | Bookbinder et al. |
| 2012/0244568 | A1 | 9/2012 | Lai et al. |
| 2013/0004758 | A1 | 1/2013 | Dejneka et al. |
| 2013/0122284 | A1 | 5/2013 | Gross |
| 2014/0087194 | A1 | 3/2014 | Dejneka et al. |

FOREIGN PATENT DOCUMENTS

| | | |
|---|---|---|
| CN | 102617036 | 8/2012 |
| FR | 1439341 | 5/1966 |
| JP | 2005194120 | 7/2005 |
| WO | 2010002477 | 1/2010 |

OTHER PUBLICATIONS

FR-1 439 341, Corning Glass Works, May 1966, machine translation.*
Patent Cooperation Treaty International Notification of Transmittal of the International Search Report and the Written Opinion of the International Searching Authority, international application No. PCT/US2013/070483: mailing date Mar. 11, 2014, 10 pages.

* cited by examiner

*Primary Examiner* — Mark Halpern
(74) *Attorney, Agent, or Firm* — John T. Haran

(57) ABSTRACT

A method of forming glass ceramic articles. The articles, in some embodiments, have a three dimensional shape. A frit mixture containing the glass ceramic in frit form and a glass frit are dispersed, in some embodiments, in a vehicle to create a slurry, which is then formed into a desired shape to make a green body. Forming may be accomplished by injection molding sinter forging, casting, casting and pressing, isostatically pressing, or the like. The green body is then fired at a high temperature to burn off the binder and fuse the glass ceramic and glass frit into a solid glass ceramic body. In some embodiments, the glass ceramic powder and glass frit material may be ion exchanged to achieve surface layers having high compressive stress, resulting in high damage resistance of the article.

21 Claims, 2 Drawing Sheets

METHOD OF MAKING THREE DIMENSIONAL GLASS CERAMIC ARTICLE

This application is a 371 of PCT/US2013/070483 filed 18 Nov. 2013

This application claims the benefit of priority under 35 U.S.C. §119 of U.S. Provisional Application Ser. No. 61/728,392 filed on Nov. 20, 2012 the content of which is relied upon and incorporated herein by reference in its entirety.

BACKGROUND

The disclosure relates to a glass ceramic article, such as a cover plate for consumer electronic devices. More particularly, the disclosure relates to a method of making such glass ceramic articles. Even more particularly, the disclosure relates to a method of making such articles using frit material comprising such glass ceramics.

Shaped glass ceramic articles are entering use as outer cover or enclosure elements in consumer electronics such as mobile phones and tablets. Currently, these articles are made by first forming a "green" or unfired sheet, crystallizing ("ceramming") a portion of the sheet to form the glass ceramic, reforming the glass ceramic to its final or near net shape, and, if necessary, machining the article to its final form.

Machining complex glass ceramic shapes suffers from the disadvantage that it introduces flaws that reduce the overall strength of the glass ceramic article. In addition, tolerances for some applications are tight, typically in the range of ±100 microns (μm). Meeting such tolerances is challenging due to volume changes that occur during the ceramming process. Moreover, since ceramming is performed at a temperature that is greater than the softening point of the green glass ceramic, three dimensional shapes may distort unless they are held in a precision mold.

SUMMARY

The present disclosure provides a method of forming glass ceramic articles. The articles, in some embodiments, have a three dimensional shape. The glass ceramic is in the form of a frit powder and is mixed with a glass frit having a low melting point. The frit mixture is dispersed, in some embodiments, in a vehicle to create a slurry, which is then formed into a desired shape to make a green body. Forming may be accomplished by injection molding sinter forging, casting, casting and pressing, isostatically pressing, or the like. The green body is then fired at a high temperature to burn off the binder and fuse the glass ceramic and glass frit into a solid glass ceramic body. In some embodiments, the glass ceramic powder and glass frit material comprise ion exchangeable alkalis, and may thus be ion exchanged to achieve surface layers having high compressive stress, resulting in high damage resistance of the article.

Accordingly, one aspect of the disclosure is to provide a method of making a glass-ceramic body. The method comprises: providing a slurry, the slurry comprising a vehicle, a glass frit material, and at least one of a glass-ceramic powder and a ceramic powder; forming the slurry into a green body; and firing the green body to form the glass ceramic body.

These and other aspects, advantages, and salient features will become apparent from the following detailed description, the accompanying drawings, and the appended claims.

DETAILED DESCRIPTION

Figure 1:
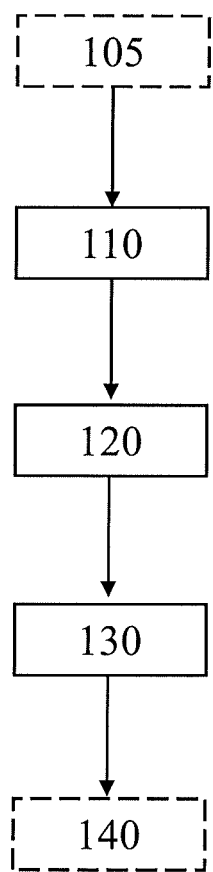
FIG. 1 is a flow chart for a method of making a glass ceramic body.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

As used herein, the terms "glass ceramic powder" or "glass ceramic frit" refer to glass ceramic that has been formed into a fine powder or "frit" by grinding or other means known in the art. The term "glass frit" refers a fine glass powder that is formed by grinding glass or by other means known in the art. The term "green body" refers to a slurry comprising a glass frit and at least one of a glass ceramic powder and a ceramic powder that is not fired. In some embodiments, the green body may be formed into the shape of the final article. The term "glass ceramic body" refers to a solid, continuous glass ceramic body or shape obtained after firing a green body.

As used herein, the term "glass ceramic" refers to a material having at least one crystalline phase that is thermally developed in a substantially uniform pattern throughout at least a portion of a glass precursor. Glass ceramics are described in U.S. Pat. No. 5,491,115, by Robert W. Pfitzenmaier et al., entitled "Colored Glass-Ceramics and Method," issued on Feb. 13, 1996, the contents of which are incorporated herein by reference in their entirety. In addition to a crystalline phase, glass ceramics also include an amorphous phase. Glass ceramic materials are typically produced by first melting a mixture of raw materials, which generally include a nucleating agent, to form a glass; forming an article from the glass; cooling it to a temperature below the transformation temperature of the glass, and crystallizing (also referred to as "ceramming") at least a portion of the glass article by an appropriate treatment. Glass ceramics may comprise from about 30% to about 90% of crystalline material by volume and may possess a variety of properties such as low or zero porosity, high strength, translucency, opacity, pigmentation, and opalescence. Non-limiting examples of glass ceramics include compounds in the $Li_2O$—$Al_2O$—$SiO_2$ system (also referred to as the "LAS system"), the MgO—$Al_2O_3$—$SiO_2$ system (also referred to as the "MAS system"), and the ZnO—$Al_2O_3$—$SiO_2$ system (also referred to as the "ZAS system").

In some embodiments, the glass ceramic has a major crystal or crystalline phase; i.e., the glass ceramic contains at least about 30% by volume (vol %) of crystalline material. In other embodiments, the glass ceramic contains at least 90 vol % of crystalline material. In other embodiments, the glass ceramic has a major or predominant amorphous or glass phase (as used herein, "amorphous phase" and "glass phase" are considered to be equivalent terms and are used interchangeably). A glass ceramic having a major amorphous phase contains less than about 30 vol % crystalline material. In some embodiments, the glass ceramic comprises up to about 95 vol % of amorphous material or amorphous phase.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

A method of making a glass ceramic body is provided. A flow chart showing the different steps included in the method and its various embodiments are shown in FIG. 1. The method 100 comprises providing and/or forming a slurry (step 110 in FIG. 1). The slurry comprises glass frit and a glass ceramic powder, a ceramic powder, or combinations thereof, and may be formed by those means know in the art, including mixing and blending techniques. The slurry further comprises a vehicle such as, for example, a binder, in which the glass frit and glass ceramic powder and/or ceramic powder are dispersed.

Figure 2:
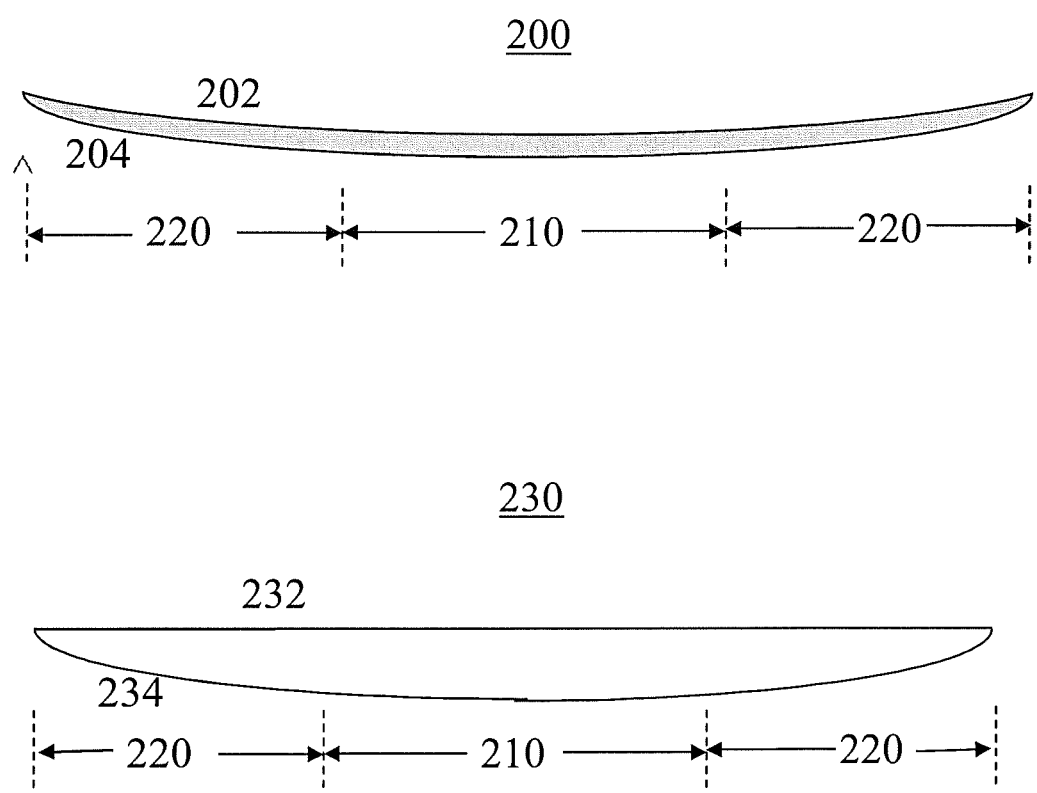
FIG. 2 shows schematic cross-sectional views of two examples of dish-shaped glass ceramic articles.

Once the slurry is provided, the slurry is formed into a green body having a desired shape (step 120 in FIG. 1), using those means known in the art such as, but not limited to, injection molding, sintered forging, casting, casting and pressing, isostatic pressing, or combinations thereof. In some embodiments, compression or pressure is applied during forming of the green body to increase the density of the green body and thus form a void-free, strong green body. In some embodiments, the desired shape of the green body is a three dimensional shape. Non-limiting examples of such three dimensional shapes include those articles in which at least one surface has a dish-shaped, curved, convex, or concave profile. Dish-shaped articles may have a substantially flat portion bounded on at least one side by a curved portion. Non-limiting examples of dish-shaped glass ceramic articles are schematically shown in cross-sectional views in FIG. 2. Dish-shaped article 200 has two major surfaces 202, 204 each of which has a substantially flat or planar portion 210, bounded on either end (or, alternatively, on both ends) by a curved portion 220 to provide a dish-shaped profile or appearance. In other embodiments, dish-shaped article 230 has only one major surface 234 having a substantially flat or planar portion 210, bounded on either end (or, alternatively, on both ends) by a curved portion 220. The remaining major surface 232 is substantially flat or planar.

Once formed, the green body is then fired or heated at a temperature that is sufficiently high so as to "burn out" or otherwise remove the vehicle/binder from the body and fuse the glass frit, glass ceramic and/or ceramic into a solid glass ceramic body (step 130 in FIG. 1). The firing step in which the glass and glass ceramic (or ceramic) are fused may also be referred to as "ceramming" the green body. The actual temperature and conditions (e.g., number heating steps and atmosphere under which firing takes place) under which the green body is fired depends on the nature of the vehicle/binder, the glass frit, the glass ceramic powder, and/or the ceramic powder comprising the slurry and green body. In some embodiments, for example, the glass ceramic body is formed by heating the green body at a temperature in a range from about 880° C. to about 1150° C. and, in other embodiments, by heating the green body at a temperature in a range from about 930° C. to about 1050° C.

In some embodiments, method 100 may also include providing at least one of the glass frit, the glass ceramic powder, and/or ceramic powders (step 105 in FIG. 1). The step of providing these materials may include synthesizing the material or materials from raw materials, refining, and forming them into powders. These materials may be formed and/or pulverized by those means known in the art.

In some embodiments, the resulting glass ceramic body is ion exchangeable. In such embodiments, method 100 may further include ion exchanging the glass ceramic body (step 140 in FIG. 1) using those means known in the art such as, but not limited to, immersion of the glass ceramic body in at least one molten salt bath. Step 140 may include single or multiple ion exchange steps and additional washing and annealing steps either before or after each ion exchange. The ion exchanged glass ceramic body, in some embodiments, has a layer under a compressive stress (also referred to as a "compressive layer"), the layer extending from at least one surface to a depth of layer into the bulk of the glass ceramic body. In some embodiments, the depth of layer is greater than or equal to 2% of the overall thickness of the glass ceramic body. In some embodiments, the compressive stress is at least 300 MPa and, in other embodiments, at least 500 MPa. In one particular non-limiting example, glass ceramic body has an overall thickness of 2 mm and a compressive layer having a depth of layer of 40 μm and a compressive stress of at least 500 MPa. Such ion exchange provides the glass ceramic body with increased damage resistance.

Any glass ceramic composition known in the art, including those in the LAS, MAS and ZAS systems described above, may be used to form the glass ceramic frit powder.

In some embodiments, the glass ceramic is an opaque white glass ceramic in which the predominant crystalline phase is a β-spodumene solid solution and comprises: from about 62.0 mol % to about 72.0 mol % $SiO_2$; from about 12.0 mol % to about 17.0 mol % $Al_2O_3$; from about 5.0 mol % to about 13.0 mol % $Li_2O$; from 0 mol % to about 2.0 mol % ZnO; from 0 mol % to about 2.5 mol % MgO; from about 3 mol % to about 6 mol % $TiO_2$; from 0 mol % to about 2 mol % $B_2O_3$; from about 0.5 mol % to about 5.0 mol % $Na_2O$; from 0-1 $K_2O$ mol %; from 0 mol % to about 1 mol % $ZrO_2$, from 0 mol % to about 0.25 mol % $Fe_2O_3$; and from about 0.05 mol % to about 0.15 mol % $SnO_2$, wherein the molar ratio $(Li_2O+Na_2O+K_2O+MgO+ZnO)/(Al_2O_3+B_2O_3)$ is between 0.7 to 1.5 and the molar ratio $(TiO_2+SnO_2)/(SiO_2+B_2O_3)$ is greater than 0.04. The glass ceramic has a crystal phase assemblage in which the β-spodumene solid solution has a molar ratio $Li_2O:Al_2O_3:nSiO_2$ of 1:1:5-1:1:8 and comprises at least 70 vol % of the crystalline phase. Furthermore, the glass-ceramic material includes a minor Ti-containing crystalline phase comprising acicular crystals having a length of greater than or equal to 0.5 μm. Finally, the glass ceramic is opaque and exhibits an opacity ≥85% over the wavelength range of 400-700 nm for a 0.8 mm thickness. The glass ceramic material is described in U.S. Patent Provisional Application No. 61/623,905, filed Apr. 13, 2012, by George H. Beall et al., entitled "White, Opaque β-Spodumene/Rutile Glass-Ceramic Articles and Methods for Making the Same," the contents of which are incorporated herein by reference in their entirety.

In other embodiments, the glass ceramic contains less than about 20 vol % if one or more oxide crystalline phases and comprises from about 50 mol % to about 76 mol % $SiO_2$, from about 4 mol % to about 25 mol % $Al_2O_3$, from about 0 mol % to about 14 mol % $P_2O_5+B_2O_3$, from about 0 mol % to about 22 mol % $R_2O$ wherein $R_2O$ is at least one alkali metal oxide, and from about 0 mol % to about 5 mol % of at least one nucleating agent. In some embodiments, the glass ceramic is color-tunable. The glass ceramics are described in U.S. Patent Provisional Application No. 61/706,733, filed Sep. 27, 2012, by Matthew J. Dejneka et al., entitled "Glass-Ceramic(s); Associated, Colorable and/or Formable Ceramable Glass(es), and Associated Process(es)," the contents of which are incorporated herein by reference in their entirety.

To provide greater strength, the glass ceramic powder may comprise an ion exchangeable glass ceramic, so that the final ceramed glass ceramic body may be ion exchanged to form a surface layer having high compressive stress (CS). In some embodiments, the glass ceramic powder or frit may be replaced completely or partially by a ceramic material powder or nanopowder such as, but not limited to, alumina, zirconia-toughened alumina, silica, mullite, combinations thereof, or the like. In some embodiments, the ceramic powder comprises a glass-forming ceramic that is capable of forming stronger bonds with the glass frit during the firing process. However other ceramic powders such as zircon, ytrria, zinc oxide, or the like may also be added to adjust properties such as density, color, or the like of the glass ceramic body.

In some embodiments, the glass frit comprises an alkali aluminosilicate glass with high alkali content (particularly, with high concentrations of sodium and lithium), in the sodium-disilicate-albite system. However, other compositions having good ion exchange properties (i.e., glasses that are capable achieving surface layers having acceptable compressive stress and depth of layer) may also be used as the glass frit material. Non limiting examples of such glasses include, but are not limited to those glasses described in: U.S. Pat. No. 7,666,511 by Adam J. Ellison et al., entitled "Down-Drawable, Chemically Strengthened Glass for Cover Plate," filed Jul. 27, 2007, and claiming priority to U.S. Provisional Patent Application No. 60/930,808, filed on May 18, 2007; U.S. patent application Ser. No. 12/277,573 by Matthew J. Dejneka et al., entitled "Glasses Having Improved Toughness And Scratch Resistance," filed Nov. 25, 2008, and claiming priority to U.S. Provisional Patent Application No. 61/004,677, filed on Nov. 29, 2008; U.S. patent application Ser. No. 12/392,577 by Sinue Gomez et al., entitled "Fining Agents for Silicate Glasses," filed Feb. 25, 2009, and claiming priority to U.S. Provisional Patent Application No. 61/067,130, filed on Feb. 26, 2008; U.S. patent application Ser. No. 12/856,840 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009; U.S. patent application Ser. No. 12/858,490 by Kristen L. Barefoot et al., entitled "Crack And Scratch Resistant Glass and Enclosures Made Therefrom," filed Aug. 18, 2010, and claiming priority to U.S. Provisional Patent Application No. 61/235,767; U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010; in U.S. Provisional Patent Application No. 61/560,434 by Timothy M. Gross, entitled "Ion Exchangeable Glass with High Crack Initiation Threshold," filed Nov. 16, 2011; U.S. Provisional Patent Ion Application No. 61/503,734 by Matthew J. Dejneka et al., entitled "Ion Exchangeable Glass with High Compressive Stress," filed Jul. 1, 2011, the contents of which are incorporated herein by reference in their entirety. In some embodiments, the alkali aluminosilicate glasses described hereinabove are substantially free of (i.e., contain 0 mol % of) of at least one of lithium, boron, barium, strontium, bismuth, antimony, and arsenic.

In some embodiments, it is desirable that the glass frit comprise a glass having a low liquidus temperature (e.g. sodium-disilicate-albite has liquidus of 767° C.), as this property allows the green body to be fired and fused at low temperature, thus providing increased cost effectiveness and throughput.

Color and opacity requirements of the glass ceramic body may determine the ratio of glass ceramic to glass frit in the starting slurry. The ratio of glass ceramic to glass frit, in some embodiments, is a range from 5 wt % to 90 wt %. In some embodiments, the glass ceramic powder has a coefficient of thermal expansion (CTE) that is either low or negative (<0), thus providing the ceramic frit/glass frit mixture with a CTE near zero and minimizing distortion of the fired glass ceramic body during final stages of firing and cooling.

In some embodiments, the mixture of glass ceramic frit and soft glass frit may be replaced with a partially cerammed glass ceramic frit that contains sufficient amount of a glass phase to allow the mixture to be fused together after forming the green body by, for example, injection molding.

In some embodiments, the vehicle binder comprises an organic binder such as, but not limited to, maltodextrin, polyvinyl alcohol, corn starch, cellulose derivatives, combinations thereof, or the like. The organic binder quantity is, in some embodiments, relatively low, and may be in a range from about 5% to about 30% by weight, so as to prevent formation of voids during firing or sintering and enable the formation of a dense glass ceramic body. In some embodiments, water glass (sodium silicate) may be added to the slurry during forming to provide the green body with plasticity while minimizing the amount of organic binder needed. Alternatively, kaolinite, montmorillonite or other similar inorganic materials that exhibit plastic behavior when wetted could be added to the slurry to minimize the amount of organic binder. In some embodiments, the vehicle/binder is UV curable and allows the skin of the green body to be strengthened before firing/sintering by exposure to UV radiation.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:
1. A method of making a glass-ceramic body, the method comprising:
   a. forming a slurry into a green body, wherein the slurry comprises a vehicle, a glass frit material, and at least one of a glass-ceramic powder and a ceramic powder, wherein a weight ratio of the at least one of a glass ceramic powder and a ceramic powder to the glass frit is in a range from about 0.05 to about 0.90; and
   b. firing the green body to form the glass ceramic body.
2. The method of claim 1, further comprising providing a glass-ceramic powder, wherein providing the glass ceramic powder comprises grinding a glass ceramic material into a powder.
3. The method of claim 1, wherein the glass ceramic powder comprises at least one compound in the $Li_2O$—$Al_2O$—$SiO_2$ system, the $MgO$—$Al_2O_3$-$SiO_2$ system, and the $ZnO$—$Al_2O_3$-$SiO_2$ system.
4. The method of claim 1, wherein the glass ceramic powder is ion exchangeable.
5. The method of claim 1, wherein the glass ceramic powder has a coefficient of thermal expansion that is less than zero.
6. The method of claim 1, wherein the ceramic powder comprises at least one of alumina, zirconia toughened alumina, silica, mullite, zircon, yttria, and zinc oxide.
7. The method of claim 1, wherein the glass frit comprises an alkali aluminosilicate glass.
8. The method of claim 1, wherein the vehicle comprises an organic binder.
9. The method of claim 8, wherein the organic binder comprises maltodextrin, polyvinyl alcohol, corn starch, a cellulose derivative, or combinations thereof.
10. The method of claim 1, wherein the vehicle comprises from about 5% to about 30% of the slurry by weight.
11. The method of claim 1, wherein the glass-ceramic body is ion exchangeable.
12. The method of claim 1, wherein forming the green body comprises at least one of injection molding, sinter forging, casting, and pressing the slurry into a shape.
13. The method of claim 1, wherein firing the green body comprises heating the green body at a temperature in a range from about 880° C. to about 1150° C.
14. The method of claim 1, further comprising ion exchanging the glass ceramic body.
15. The method of claim 14, wherein the ion exchanged glass ceramic body has a layer under a compressive stress, the layer extending from a surface of the glass ceramic body to a depth of layer.
16. The method of claim 15, wherein the compressive stress is at least 300 MPa.
17. The method of claim 15, wherein the depth of layer is at least about 40 µm.
18. The method of claim 1, wherein the glass ceramic body has a three dimensional shape.
19. The method of claim 18, wherein the three dimensional shape comprises at least one of a curved surface portion, a concave surface portion, a convex surface portion.
20. The method of claim 18, wherein the three dimensional shape comprises a dish shape.
21. The method of claim 1, wherein the glass ceramic body contains less than about 30 vol % crystalline material.

* * * * *